UNITED STATES PATENT OFFICE.

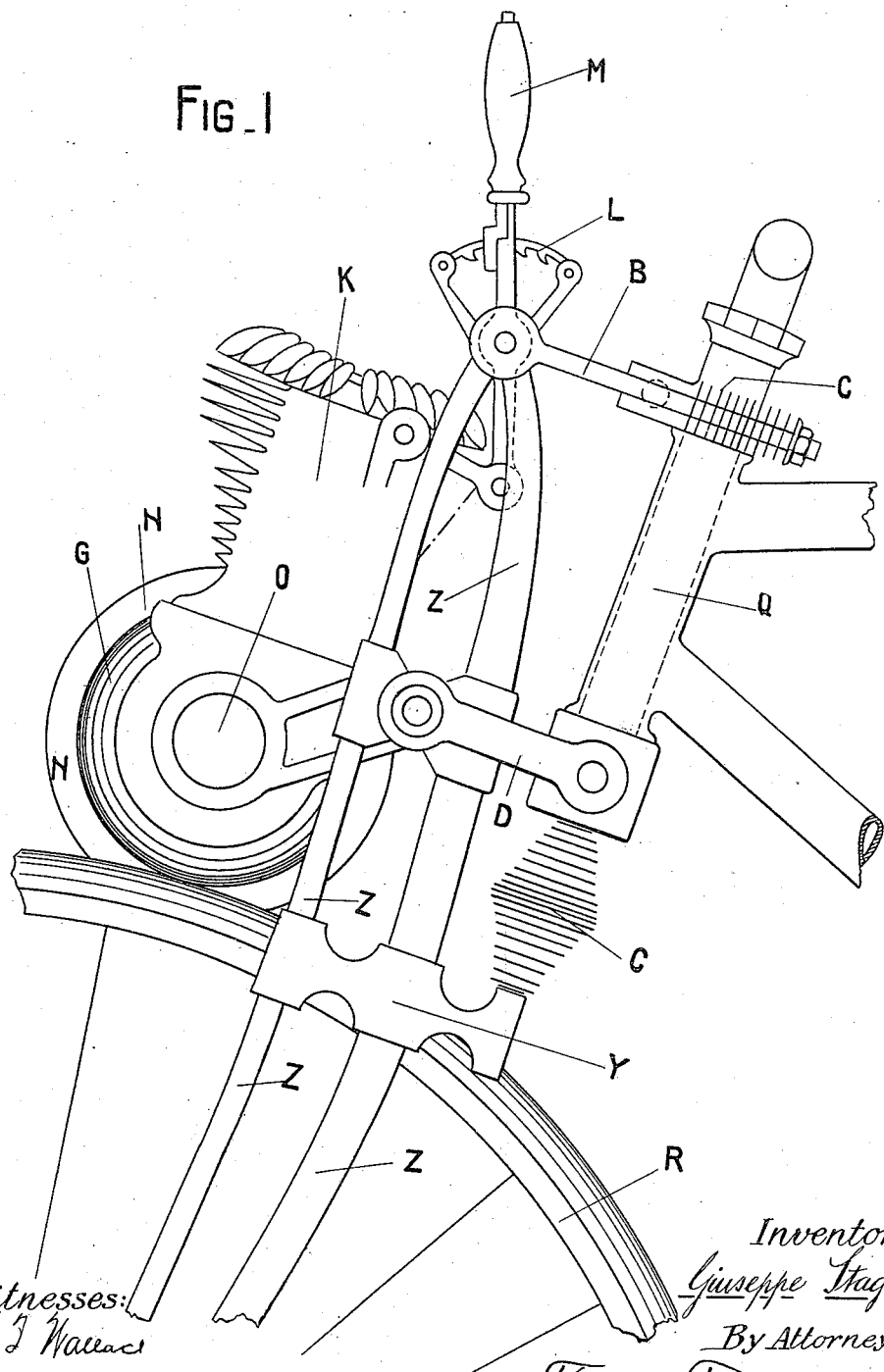

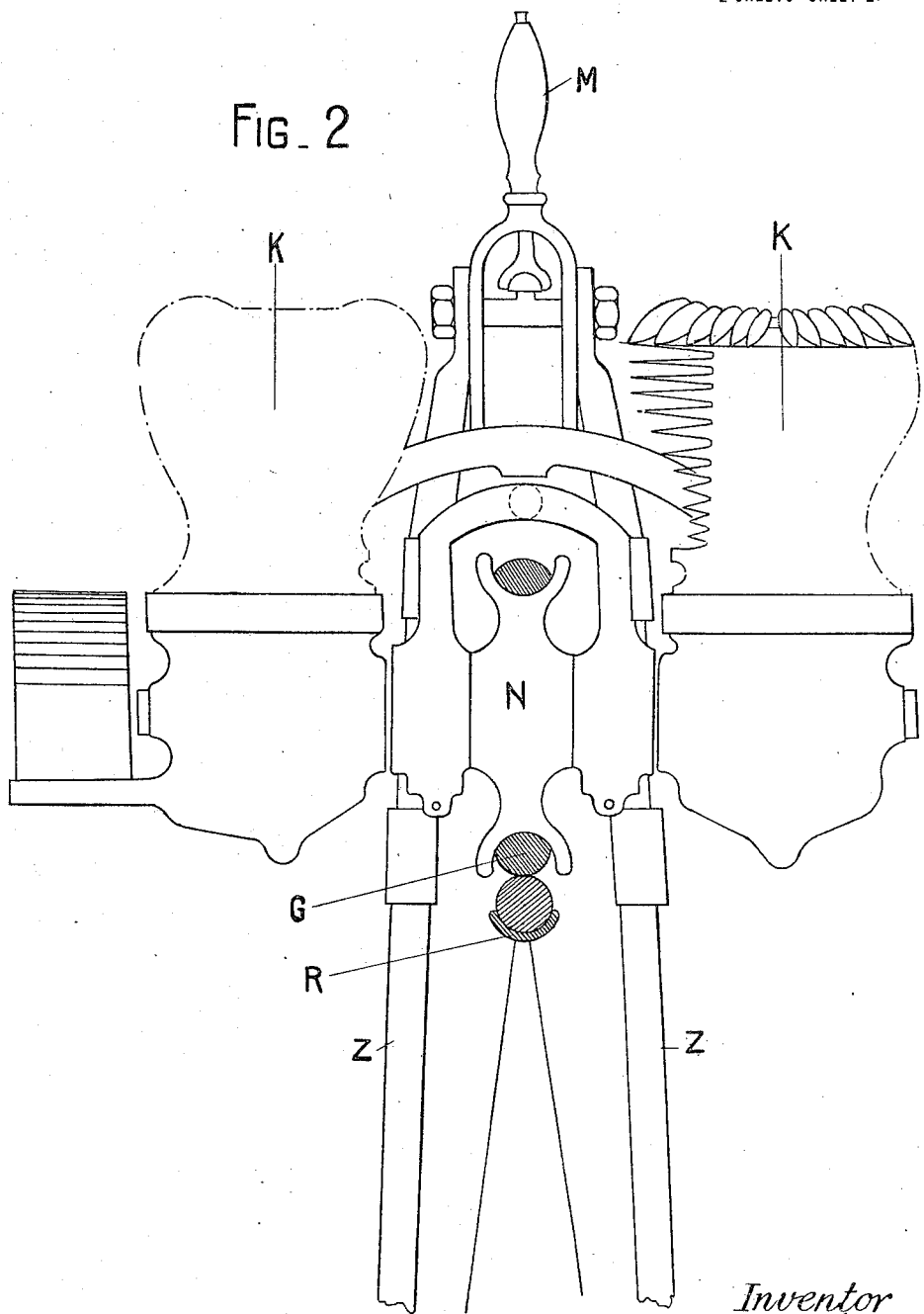

GIUSEPPE STAGNI, OF TURIN, ITALY.

MOTOR FORE-CARRIAGE FOR BICYCLES AND SIMILAR VEHICLES.

1,203,927.  Specification of Letters Patent.  Patented Nov. 7, 1916.

Application filed May 1, 1914. Serial No. 835,695.

*To all whom it may concern:*

Be it known that I, GIUSEPPE STAGNI, residing at Turin, Italy, have invented certain new and useful Improvements in Motor Fore-Carriages for Bicycles and Similar Vehicles, of which the following is a full, clear, and exact specification.

The present invention relates to a motor fore-carriage particularly designed for application to any kind of bicycles or other similar vehicles, which can be easily and rapidly transformed in a motor-cycle.

The invention consists in a single-cylinder or two-cylinder explosion motor, which can be also as well of the two-stroke as of the four-stroke type; further, in a roller which is in one piece with the driving shaft, which, by means of friction, transmits the motion to the front wheel of the cycle; in means whereby the device may be elastically coupled to the steering head tube of the cycle; and in means whereby the roller may be maintained either attached to, or separated from the wheel.

The roller could be substituted by a belt-pulley or chain-gearing or similar device, in case this kind of transmission be preferred to the friction transmission. The whole of the above mentioned pieces could also be previously attached to a fork which can in turn be attached in any convenient manner to a steering head to be readily substituted for the one existing in all cycles.

The annexed drawing shows diagrammatically a manner of practical application of the invention.

Figures 1 and 2 are a side- and front-view of a fore-carriage constructed in accordance with the present invention.

K K are two cylinders of a two-stroke or a four-stroke engine; N the roller which is in one piece with the shaft O of the engine, (which roller can, as we have said, be substituted by a belt-pulley or a chain-gearing) which roller transmits by friction, by means of a rubber-tread or any similar tread, the motion to the wheel R of the cycle. Z is the fork which is conveniently of the reinforced type and which, by means of the shackles B, is attached to the steering head Q which enters the steering tube of the cycle.

C, C are the elastic means whereby the whole is assembled, and the engine K can be raised or lowered with relation to the fork Z by means of a lever-system comprising a lever M and a stopping rack L.

What I claim is:

1. A device of the character described, comprising a fore-frame, a steering head, a resilient connection between the two, a wheel in said fore-frame, a motor mounted on said fore-frame on each side of the plane of the wheel, a common drive-shaft connected to said motors and running crosswise of the plane of the wheel, and a driving connection between said drive-shaft and the tire of the wheel.

2. A device of the character described, comprising a fore-frame, a steering head, a resilient connection between the two, a wheel in said fore-frame, a motor mounted on said fore-frame on each side of the plane of the wheel, a common drive-shaft connected to said motors and running crosswise of the plane of the wheel, and a roller on said drive-shaft adapted to frictionally engage the tire of the wheel for driving the latter.

3. A device of the character described, comprising a fore-frame, a steering head, a resilient connection between the two, a wheel in said fore-frame, a motor mounted on said fore-frame, and a driving connection between said wheel and motor, said motor being pivoted on the fore-frame, a means mounted on said fore-frame for moving said motor and driving connection into and out of engagement with the tire of the wheel.

In witness whereof, I have hereunto signed my name in the presence of two subscribing witnesses.

GIUSEPPE STAGNI.

Witnesses:
 FELICE BAZETTE,
 C. S. TEYLER.

Copies of this patent may be obtained for five cents each, by addressing the "Commissioner of Patents, Washington, D. C."